United States Patent
Leyerle

[19]

[11] Patent Number: 6,097,392

[45] Date of Patent: Aug. 1, 2000

[54] METHOD AND SYSTEM OF ALTERING AN ATTRIBUTE OF A GRAPHIC OBJECT IN A PEN ENVIRONMENT

[75] Inventor: Christopher B. Leyerle, Issaquah, Wash.

[73] Assignee: Microsoft Corporation, Redmond, Wash.

[21] Appl. No.: 07/942,971

[22] Filed: Sep. 10, 1992

[51] Int. Cl.[7] ................................. G06F 3/00; G06K 9/00
[52] U.S. Cl. ........................... 345/358; 345/179; 382/209; 382/189
[58] Field of Search ...................... 395/155, 161, 395/133, 156, 157; 364/237.1, 927.6; 345/179, 180, 182, 183, 326, 333, 334, 335, 339, 348, 352, 358, 433; 382/15, 25, 30, 36, 209, 203, 187, 188, 189, 224

[56] References Cited

U.S. PATENT DOCUMENTS

| | | | |
|---|---|---|---|
| 4,475,239 | 10/1984 | van Raamsdonk | 382/309 |
| 5,010,500 | 4/1991 | Makkuni et al. | 345/358 |
| 5,133,052 | 7/1992 | Bier et al. | 707/530 |
| 5,155,813 | 10/1992 | Donoghue et al. | 345/179 |
| 5,252,951 | 10/1993 | Tannenbaum et al. | 345/156 |
| 5,319,721 | 6/1994 | Chefalas et al. | 382/160 |

OTHER PUBLICATIONS

Rubine, "Specifying Gestures by Example," In Proceedings of ACM Siggraph '91, Computer Graphics, vol. 25, No. 4, Jul. 1991, pp. 329–337.

Kurtenbach et al., "Issues in Combining Marking and Direct Manipulation Techniques," In Proceeding on the Symposium on User Interface Software and Technology, Nov. 1991, pp. 137–144.

*Primary Examiner*—Crescelle N. dela Torre
*Attorney, Agent, or Firm*—Machalik & Wylie, PLLC

[57] ABSTRACT

A method and system for altering an attribute of a graphic object in a computer system is provided. An attribute, such as a line style or fill pattern, has a plurality of formats. The computer system includes a handwriting instrument and an electronic tablet. Each attribute of a graphic object has an associated input area on the electronic tablet. The user draws a gesture with the handwriting instrument over a selected one of the input areas. The gesture drawn is indicative of a desired format selected for the attribute and associated with the selected input area. The system recognizes the gesture drawn over the selected input area and then determines the desired format represented by the gesture drawn. The system then changes the format of the attribute associated with the selected input area to the desired format. If the system is not able to recognize the gesture drawn, the user can define the gesture as a custom attribute which will be recognized by the system the next time the gesture is drawn.

22 Claims, 8 Drawing Sheets

METHOD AND SYSTEM OF ALTERING AN ATTRIBUTE OF A GRAPHIC OBJECT IN A PEN ENVIRONMENT

TECHNICAL FIELD

This invention relates generally to the data entry of graphic objects in a pen environment and particularly to the alteration of an attribute of a graphic object.

BACKGROUND OF THE INVENTION

Handwriting recognition systems allow users to input handwritten data into a computer. The user writes data on an electronic tablet with a special pen, and as the user moves the pen across the tablet, the tablet displays lines to the user corresponding to the pattern travelled by the pen. These lines appear as they are written until the pen is lifted from the tablet. After a predetermined time period, or upon some user action (e.g., lifting the pen, tapping in another window), the handwritten lines are recognized as letters, symbols, numbers, or graphical shapes and translated into type.

Handwriting recognition systems use algorithms to map handwritten data to recognizable symbols. Typically, these systems store a prototype for each symbol the system can recognize. A prototype is a "picture" of a handwritten symbol that is used to map handwriting to that symbol. Recognition systems use recognition algorithms to map pen-based handwritten data to a prototype.

Prior art systems allow users to communicate with the system by drawing gestures. Gestures are special handwritten symbols that issue a command to the system. In most prior art systems, users can draw gestures whenever the pen is in what is known as write mode, as opposed to draw mode. When in write mode, a gesture must be the first symbol that a user draws. If the user draws a gesture in the middle of drawing an object, the gesture is treated as part of the object. The table below contains examples of standard, predefined gestures supported by most prior art pen-based systems. Note that some of the predefined gestures are positional, i.e., it matters where the user draws the gesture. For example, the Select Object gesture selects the object the gesture is written over. Non-positional gestures operate at the insertion point and do not need any additional context. For example, the Undo gesture reverses the last action, no matter where the gesture is written.

| | Action | Type |
|---|---|---|
| Selection Gestures | | |
| . | Place the insertion point or select object | Positional |
| ↟↡ | Extend selection | Positional |
| Deletion Gestures | | |
| ✗ | Cut Current selection | Non-positional if selection exists Positional if no selection exists |
| ⁒ | Delete current selection | Positional if selection exists Non-positional if no selection exists |
| ⋈ | Backspace. Delete the character under gesture | Positional |

| | Action | Type |
|---|---|---|
| Editing Gestures | | |
| ✓ | Place the checked word or selection in the Edit Text dialog box | Selection-based |
| ⌐ | Cut selection | Non-positional |
| ∝ | Copy selection | Non-positional |
| ∧ | Paste at the top of the triangle (if positional) or at the insertion point | Optional |
| ⋎ | Undo the previous action | Non-positional |

In prior art pen-based systems, gestures are used only to simplify minor editing tasks. No prior art systems are known that support direct manipulation tasks through the use of gestures. That is, no prior art systems allow a user to draw a gesture to modify the attributes of a graphic object. Attributes of a graphic object include line style and fill pattern.

SUMMARY OF THE INVENTION

It is an objective of the present invention to provide an improved graphics data system for a pen environment.

A further objective is to provide a system of the type described in which a user may select an existing graphic object and change its attributes in one step.

Yet another objective is to provide a system in which a user may design custom attributes to be applied to graphic objects.

According to the principles of the invention, a method and apparatus are provided for the direct manipulation of the attributes of a graphic object in a pen environment. The selection of an existing object and designation of its attribute are accomplished in one step. For example, the user draws a representation of a line style over a predesignated area of the object and the line style changes to match the drawn representation. Similarly, the selection of an object and designation of its corresponding fill pattern are accomplished in one step: the user draws a representation of a fill pattern over a predesignated area of the object and the fill pattern changes to match the drawn representation. The metaphor is as if one were drawing on paper. If you have an object lightly sketched on the paper, you might go over its border with your pencil, applying a particular line style, or you might go over its interior with your pencil, applying a fill pattern to the entire inside of the object. The selection of both object and format is simultaneous because what is drawn defines the format and where it is drawn defines the target attribute and graphic object.

Additionally, the present invention allows a user to create custom attributes that can be applied to a graphic object. Instead of recognizing a line style or fill pattern drawn by a user into the closest predefined prototype, the invention provides a method for taking a gesture as drawn and applying it repeatedly without modification to a particular graphic object.

The above-identified objects and other objects of the present invention will be apparent to those skilled in the art from the following detailed description of a preferred embodiment of the invention.

DETAILED DESCRIPTION OF THE INVENTION

Figure 1:
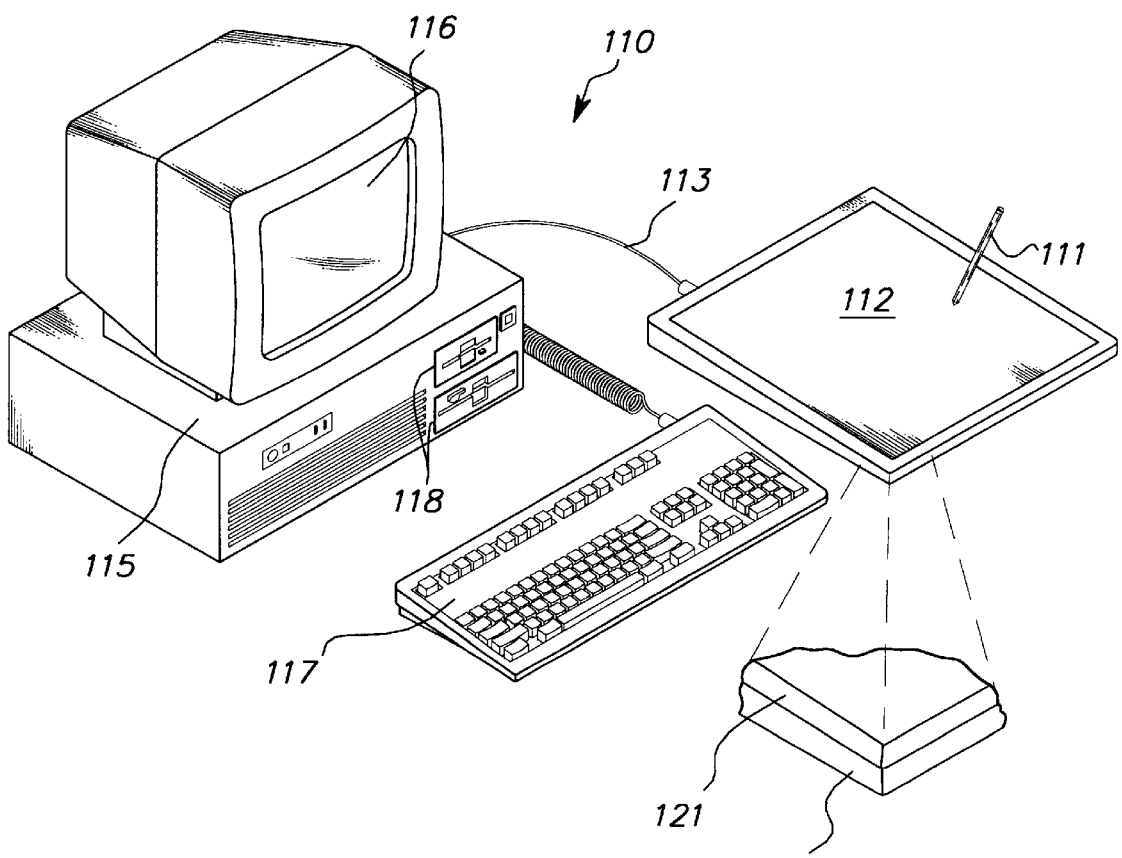
FIG. 1 is an illustration of a computer system using an electronic tablet configured to implement the methods of this invention.

FIG. 1 is an illustration of a computer system 110 configured to implement the methods of the present invention. An electronic digitizing tablet 112 is connected to a computer 115 by a cable 113. The computer also has a conventional display 116, keyboard 117 and disk drives 118. A writing instrument, such as a pen 111, is provided for a user to record graphic objects onto the tablet 112. The tablet 112 comprises an input grid 121 and a display surface 122. The input grid 121 detects contact of the pen 111 with the tablet 112. If contact is detected, then the tablet 112 sends the coordinates of the contact point to the computer 115 through the connecting cable 113. The tablet 112 periodically samples the input grid 121.

Upon receiving coordinates from the tablet 112, the computer 115 "inks" the contact point; that is, the computer 115 sends data to the tablet 112 to turn on a point on the display surface 122 that corresponds to the contact point. The display surface 122 is a standard bitmap display. To a user it looks as if the pen writes the point onto the tablet 112 where the pen 111 made contact. With an appropriate sampling rate, the computer 115 inks multiple contact points as the user moves the pen 111 across the tablet 112 to display lines corresponding to the path travelled by the pen 111. Thus, the computer system allows the user to write data onto the tablet 112.

The tablet 112 may be any suitable digitizing tablet available on the open market which outputs the coordinates of the pen 111 in contact with the tablet 112. Alternatively, the pen 111 may be electrically coupled to the tablet 112 or the computer 115 for providing pen up and pen down positions based on the tip of the writing instrument being depressed, such writing instruments being well known in the art. In one embodiment, the computer is a standard personal computer available on the open market. Other computer system configurations, however, are acceptable to implement the methods of the present invention. For example, the entire system can be incorporated in a tablet shaped device. The tablet surface is the input grid and display surface. The tablet shaped device contains the logical equivalent of the computer 115 without the display 116, keyboard 117, or disk drives 118.

In a preferred embodiment, the start of handwriting is detected by the pen contacting the input grid 121 (pen down). The end of handwriting is detected when the pen 111 is not in contact with the input grid 121 (pen up) for a period of time, which may be predetermined or may vary depending on the pace of user handwriting. Alternately, the user can indicate the start and stop of handwriting by other methods, such as selection of a menu item in the graphics program.

Figure 2:
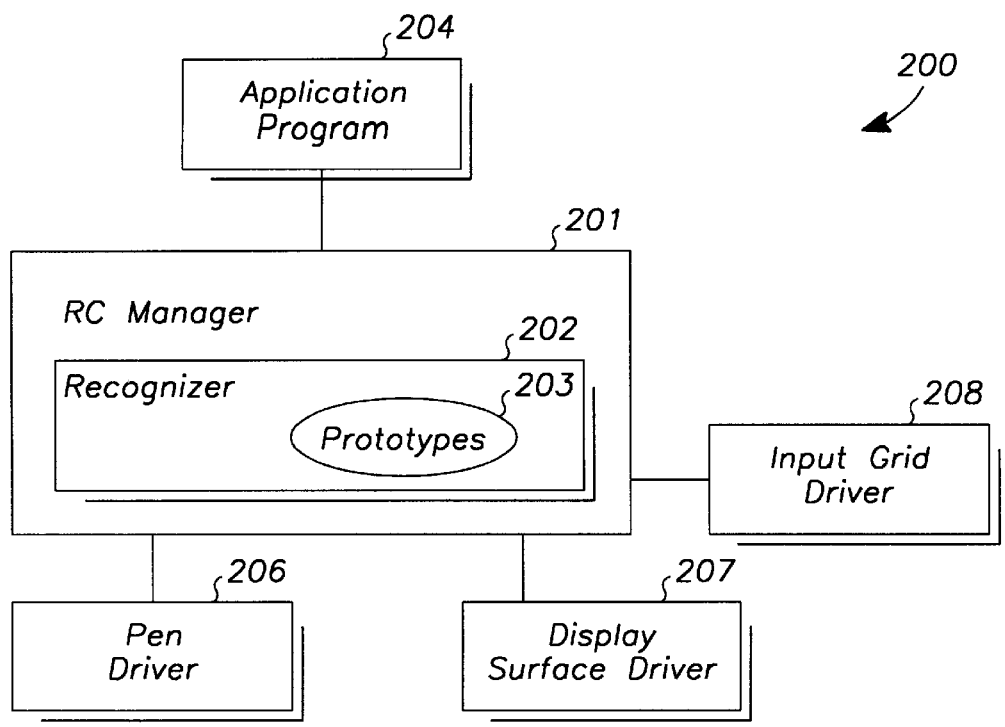
FIG. 2 is a block diagram of components in a preferred embodiment of the present invention.

FIG. 2 is a block diagram of components in a preferred embodiment of the present invention. Microsoft Windows for Pen Computing 200, manufactured by Microsoft Corporation of Redmond, Washington, includes all of the required components. Windows for Pen Computing 200 includes a Recognition Context (RC) Manager 201, which controls the inputting of the raw handwritten data through a Display Surface Driver 207. A Recognizer 202, which is a function of the RC Manager 201, receives raw handwritten data from the RC Manager 201, recognizes the raw data as symbols, and returns the recognized symbols. The methods of the present invention are not dependent on any specific recognition technique. An Input Grid Driver 208 receives the coordinate data from the input grid 121 of FIG. 1 and sends the data to the RC Manager 201. The Display Surface Driver 207 receives data from the RC Manager 201 and displays the data on the display surface 122 of FIG. 1.

Normally, in a graphics environment, when a user desires to change the line style of an existing object, a two-step process is involved. The user must select the existing object, then select the desired line style from a palette, menu, or dialog, or type some accelerator key sequence. In prior art systems, the line style is selected from a variety of predefined styles and the user is not able to create a custom line style for an object.

Similarly, when a user desires to fill an existing object with a particular fill pattern, a two-step process is involved. The user must first select the existing object and then select the desired fill pattern from a palette, menu, or dialog, or type some accelerator key sequence. In prior art systems, the user is presented with a limited variety of fill patterns, which may not be exactly what the user desires. The user is not able to create a custom fill pattern for an object.

Figure 3A:
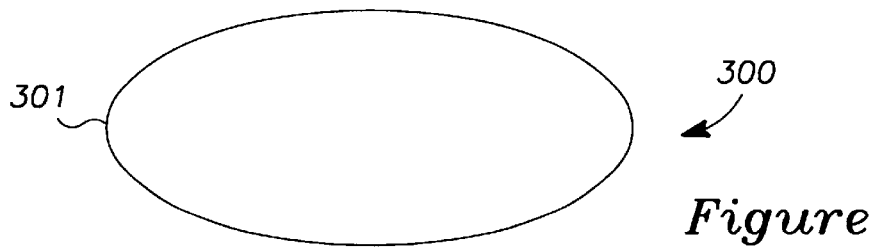
FIG. 3A is an illustration of a graphic object with a solid line style and transparent fill pattern.
Figure 3B:
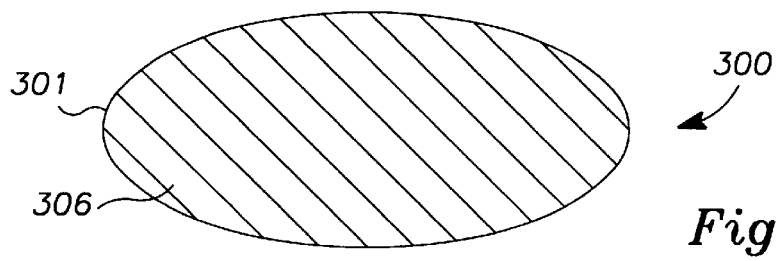
FIG. 3B is an illustration of the object of FIG. 3A with a diagonal-line fill pattern and a solid line style.
Figure 3C:
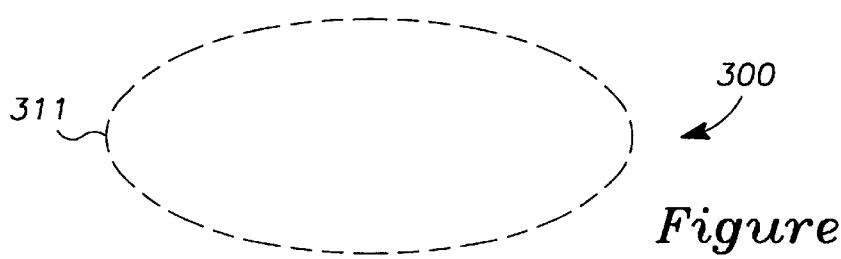
FIG. 3C is an illustration of the object of FIG. 3A with a transparent fill pattern and a dashed line style.

The present invention allows a user to modify an attribute of a graphic object without having to select the format from a preexisting list of formats. The user merely draws a gesture representing the format of an attribute on the tablet 112. Depending on where the gesture is drawn, the system may apply the format to one or more graphic objects. The format does not have to be known by the system, i.e., the user can create a custom format. FIGS. 3A–3C show examples of different attribute formats available for a graphic object. FIG. 3A is an illustration of a graphic object 300 with a solid line style 301 and transparent fill pattern. FIG. 3B is an illustration of the object of FIG. 3A with a diagonal-line fill pattern 306 and a solid line style 301. FIG. 3C is an illustration of the object of FIG. 3A with a transparent fill pattern and a dashed line style 311.

The present invention allows a user to modify an attribute of a graphic object in several ways. In a preferred embodiment of the present invention, certain gestures can be used to apply formats directly to an object, or part of an object. For example, when a user draws a gesture indicative of a fill pattern format anywhere inside of the bounding shape of an ellipse, the system will fill the ellipse with the format. Similarly, when a user draws a gesture indicative of a line style format anywhere within a certain distance from the bounding shape of a rectangle, the system will reformat the rectangle with the new line style.

Figure 4:
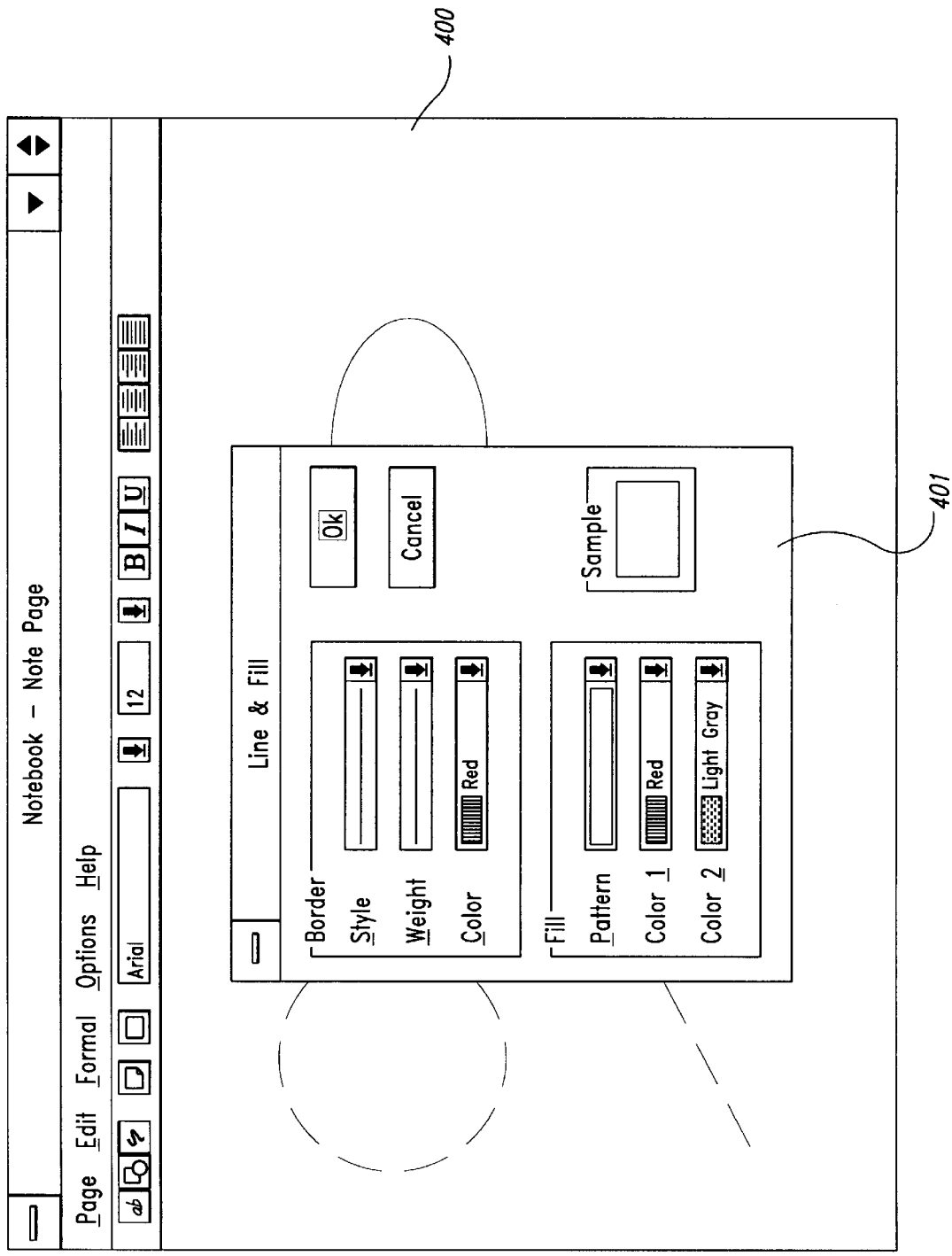
FIG. 4 is an illustration of a graphical user interface used with an alternative embodiment of the present invention.

As an alternate embodiment of the present invention, a user may double-tap the pen anywhere within an object's bounding shape to indicate to the system that the user wants to change the format of that object. After the double-tap, the system will cause a dialog box to be displayed as shown in FIG. 4. The dialog box 401 allows the user to alter attributes of the object, i.e. the line style and fill pattern, by selecting from a list of formats.

Figure 5A:
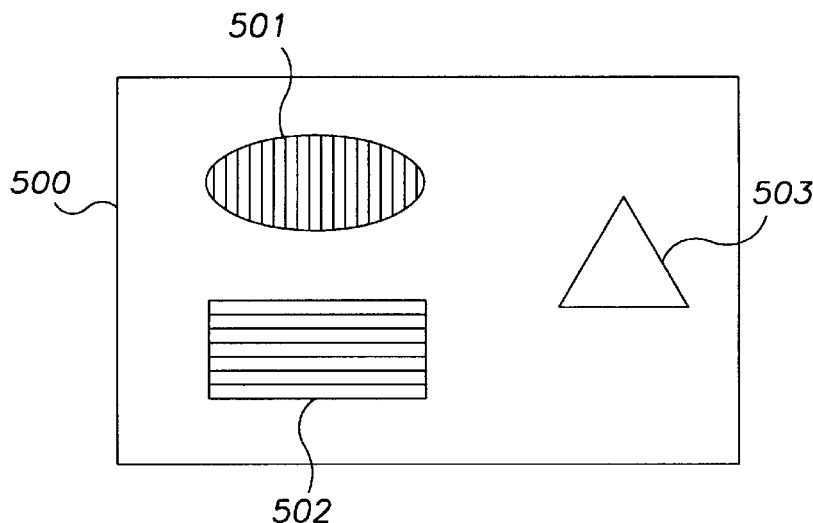
FIG. 5A is an illustration of graphic objects displayed on the electronic tablet of FIG. 1.
Figure 5B:
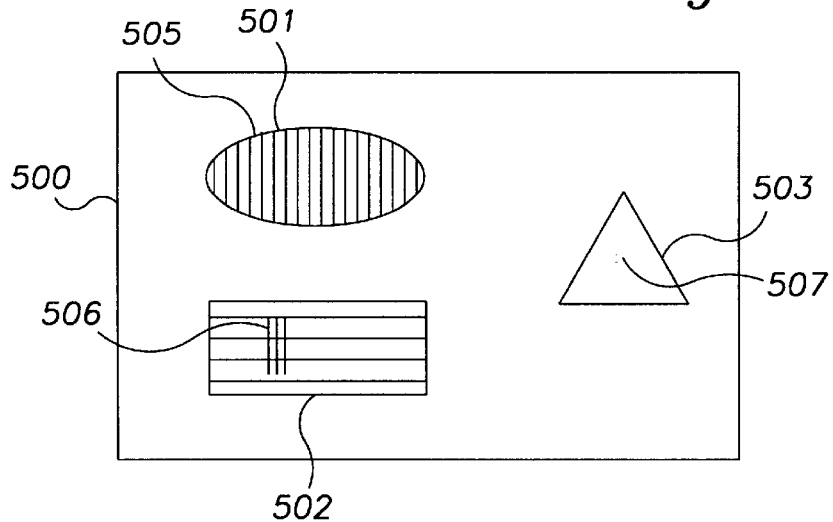
FIG. 5B is an illustration of the display of FIG. 5A after a user has drawn gestures.
Figure 5C:
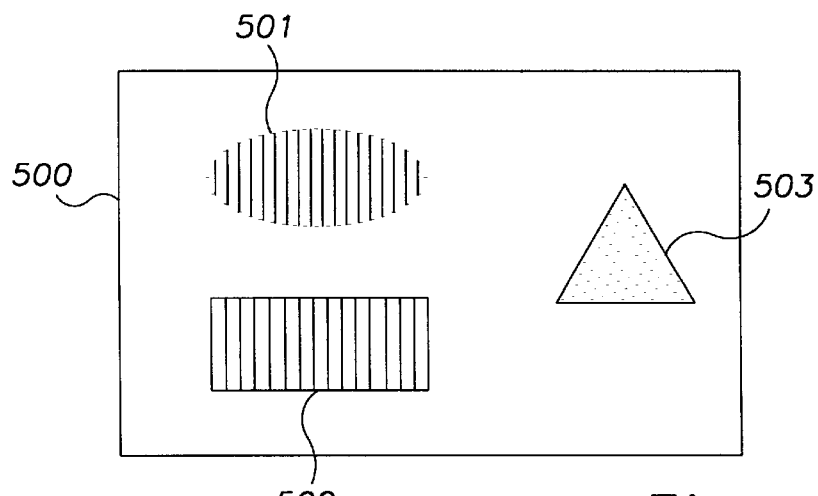
FIG. 5C is an illustration of the display of FIG. 5B after the system has recognized the gestures drawn.

FIGS. 5A through 5C are illustrations of a typical user interface employing the methods of the present invention. FIG. 5A is an ilustration of a typical output display 500 of a graphics program that accepts handwritten data. The output display 500 is displayed on the electronic tablet 112 of FIG. 1. The display 500 contains graphic objects 501–503 that have been input into the system. Object 501 has a solid line style and a vertical-line fill pattern. Object 502 has a solid line style and a horizontal-line fill pattern. Object 503 has a solid line style and a transparent fill pattern. FIG. 5B is an illustration of the display 500 of FIG. 5A after the user has handwritten gestures 505, 506, and 507 to be applied to the existing graphic objects 501, 502, and 503, respectively.

Gesture 505 represents a dotted line style and is recognized as such by the system because it is drawn in close proximity to the border of object 501. Gesture 506 represents a vertical line fill pattern and is recognized as such because it is drawn inside of the bounding shape of object 502. Gesture 507 represents a dotted line fill pattern and is recognized as such because it is drawn inside of the bounding shape of object 503. One skilled in the art would appreciate that alternatively a gesture could be drawn in any area of the display tablet (so long as the area is associated with the object to be altered). After each gesture is written, it is recognized and applied to a corresponding graphic object. The reformatted graphic objects 501, 502, and 503 are shown in FIG. 5C. Object 501 now has a dotted line style; object 502 has a vertical-line fill pattern; and object 503 has a dotted fill pattern. In a preferred embodiment of the present invention, these gestures would be applied one at a time; each object would be reformatted and redisplayed after each individual gesture was drawn.

Figure 6A:
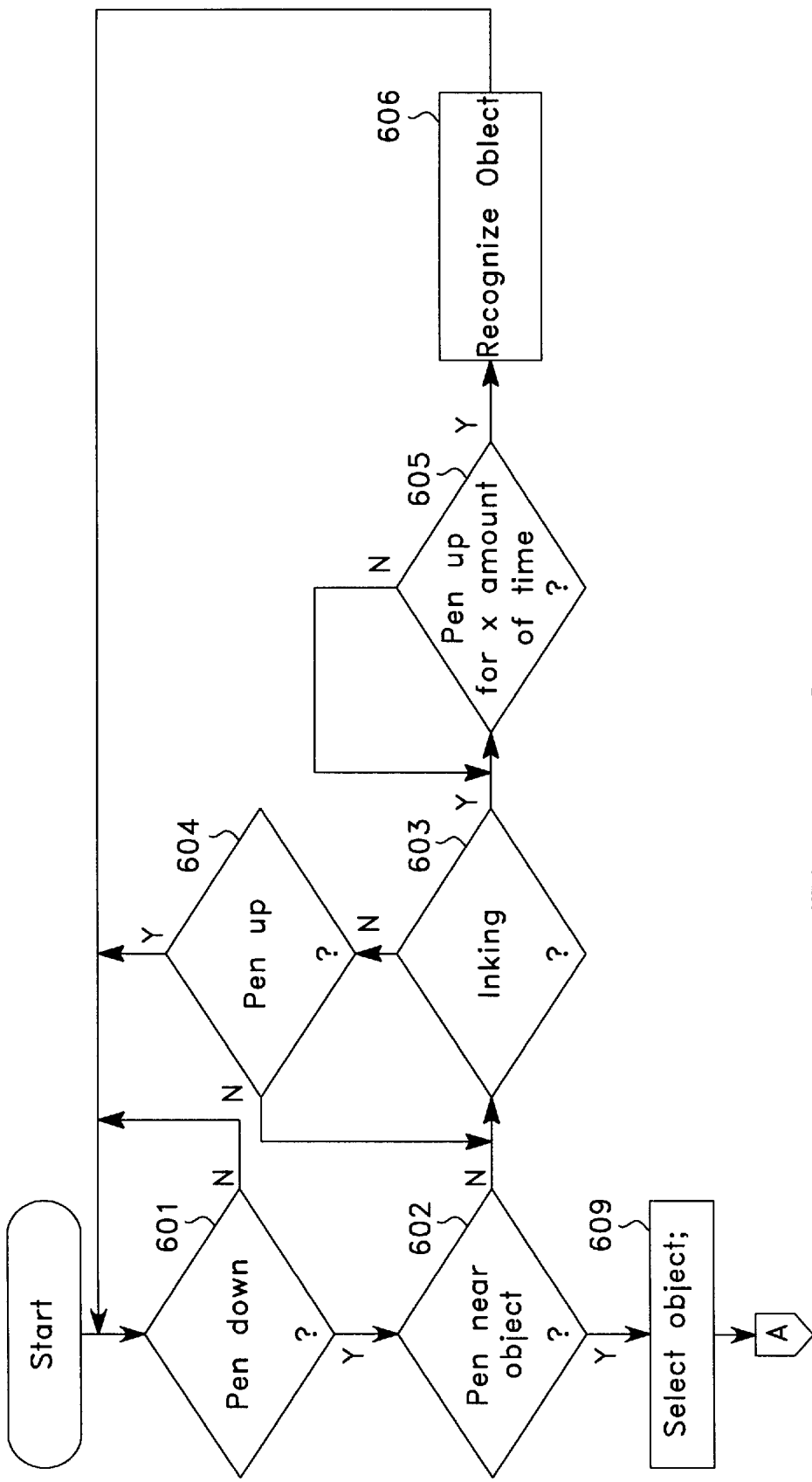
FIGS. 6A–6C comprise an overview flow diagram of a preferred embodiment of a user interface for the present invention.
Figure 6B:
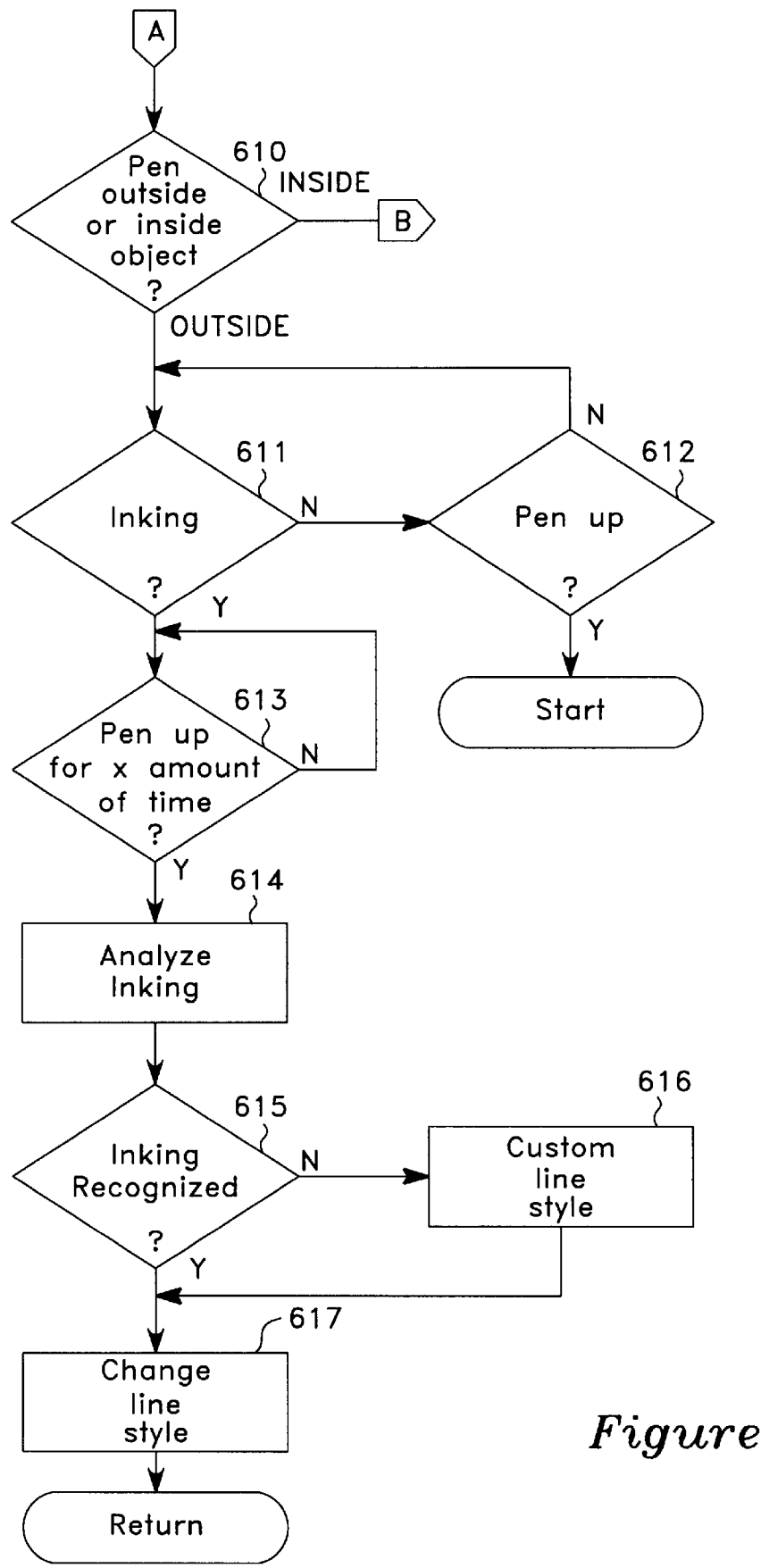
Figure 6C:
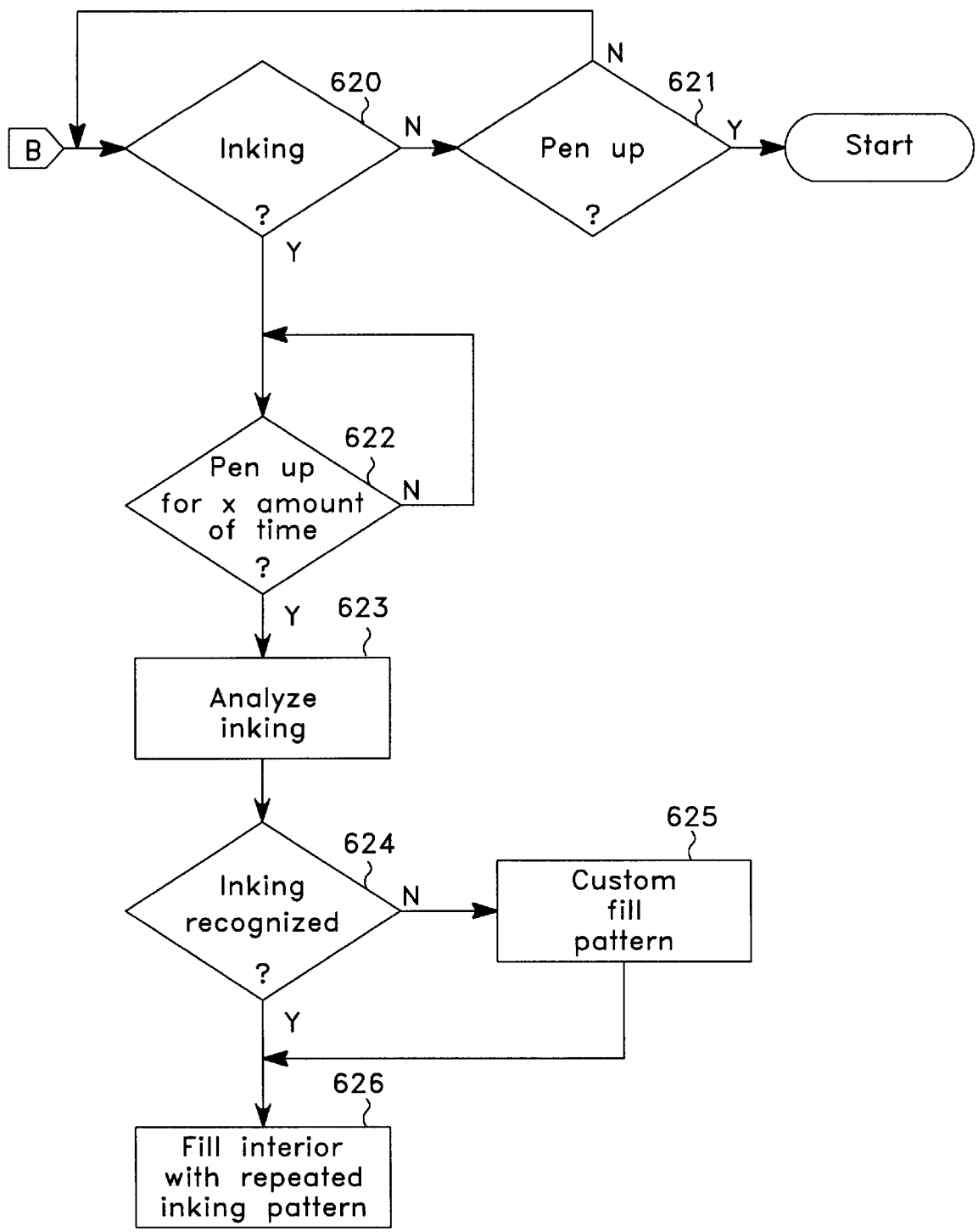
Figure 7:
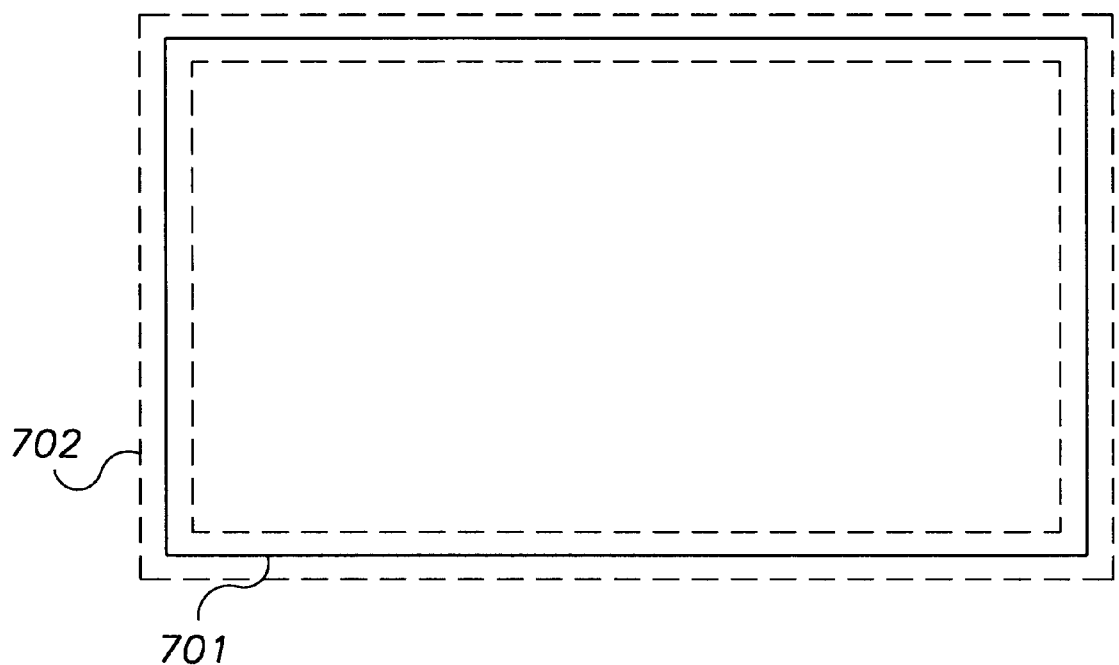
FIG. 7 is an illustration of an object with a line style border.

FIGS. 6A–6C comprise an overview flow diagram of a preferred embodiment of a user interface for the present invention. The process starts with block 601 where the system checks to see if a pen down has occurred. As stated above, "pen down" refers to when the user touches the pen 111 to the tablet 112 of FIG. 1. If a pen down has not occurred, the system loops at block 601. As soon as a pen down has occurred, the system continues on to block 602 where the system checks to see if the pen down occurred near an existing object. In a preferred embodiment, near means within an existing object's bounding shape or within a predefined area adjacent to the bounding shape. The "predefined area" can be outside the bounding shape or both outside and inside the bounding shape. For example, FIG. 7 shows an object 701, i.e., a rectangle with a transparent fill pattern. The predefined area 702 is an area of uniform size on each side of the bounding shape of object 701, indicated in FIG. 7 by dashed lines. For ease of description, the predefined area will be referred to as the line style border.

If the pen down did not occur near an object, the process continues on to block 603 where the system checks to see if the user is inking. Inking occurs when the user moves the pen across the tablet such as when drawing a new object. If the user is not inking, the process continues on to block 604 where the system checks to see if a pen up has occurred. If a pen up has occurred, the user did not draw an object or select an existing one, so the process loops back to the start at block 601 where it waits for another pen down to occur. If the system determines in block 603 that the user is not inking, and the system determines in block 604 that a pen up has not occurred, then the process waits at block 603 for the user to either move the pen across the tablet or lift the pen up off the tablet.

If the system determines in block 603 that the user is inking, the process continues on to block 605 where the system waits for the user to lift the pen up off the tablet for a predetermined amount of time. The predetermined amount of time requirement allows the user to lift the pen off of the pad momentarily without causing the system to begin analyzing the object. Once the user has lifted the pen up off the tablet for a predetermined amount of time, the process continues on to block 606 where the system recognizes the newly drawn object. The recognizer component 202 of FIG. 2 analyzes the object. An object recognition system is described in the Patent Application "Method and System for Recognizing a Graphic Object's Shape, Line Style, and Fill Pattern in a Pen Environment, filed concurrently herewith as Ser. No. 07/942,952, filed on Sep. 10, 1992, now U.S. Pat. No. 5,287,417. After the object is recognized, the process loops back to block 601.

In block 602, if the system determines that the pen down did occur near an existing object, the process continues on to block 609, where the system selects the object. After an object is selected, the process continues on to block 610, shown in FIG. 6B.

In block 610, the system determines where the pen down occurred in relation to the selected object. More specifically, the system determines whether the pen down occurred within the bounding shape or within the line style border described above. If the pen down occurred within the object's line style border, the process continues on to block 611, where the system determines if the user is inking. Any inking done by the user within the bounding shape is considered representative of a fill pattern gesture, while any inking done by the user within the line style border is considered representative of a line style gesture.

If the user is not inking, the process determines in block 612 if the user has lifted up the pen 111 for a predetermined amount of time. If a pen up has occurred, the process loops back to the beginning at block 601 and waits for another pen down. If the system determines that the pen is still on the tablet 112, the process returns to block 611 and the system waits for the user to begin inking. Once the user has begun inking, the process passes from block 611 on to block 613, where the system waits for the pen to be lifted off the tablet for a predetermined amount of time. Alternatively, the user could notify the system that the user is done inking by selecting a menu item or tapping the pen on a predefined area of the tablet 112. Once the pen has been lifted off the tablet for a predetermined amount of time, the system determines that the user is done inking and the process continues on to block 614.

In block 614, the system analyzes the gesture. If the gesture closely resembles one of a plurality of reference line styles stored in the system, the system selects that reference line style in block 615. The process continues on to block 617, where the system applies the reference line style to the selected object. Recognition of a line style is explained in more detail below. If the system cannot match the gesture with one of the reference line styles in block 615, the process jumps to the custom line style routine. The custom line style routine creates a new reference line style by storing a copy of the gesture drawn by the user. The user is given the opportunity to perfect the gesture before the new reference line style is created. When the system returns from the custom line style routine, the process continues on to block 617, where the custom line style is applied to the selected object.

Referring back to block 610, the system determines whether the pen down occurred on or within the object's bounding shape or within the line style border. If the pen down occurred on or within the object's bounding shape, the process jumps to block 620 in FIG. 6C. In block 620, the system determines if the user is inking. If the user is not inking, the system checks in block 621 to see if the pen has been lifted up off the tablet 112. If the pen has not been lifted off of the tablet and if the user is not inking, the process loops back to block 620 to wait for the user to drop ink or lift the pen up. As soon as the user begins inking, the process continues on to block 622, where the system waits for the pen to be lifted up off the tablet for a predetermined amount of time. Once the pen has been lifted off the tablet for a predetermined amount of time, the system determines that the user is done inking. The process continues on to block 623, where the system analyzes the gesture.

In block 624, the system determines if the gesture is recognized as one of a plurality of reference fill patterns stored in the system. Recognition of a fill pattern is explained in more detail below. If the gesture closely resembles one of a plurality of reference fill patterns, the system selects that reference fill pattern. The process continues on to block 626, where the system applies the reference fill pattern to the selected object. If the system cannot recognize the gesture in block 624, the process continues on to block 625 where the system calls a custom fill pattern routine. Essentially, the custom fill pattern routine analyzes the gesture and creates a reference fill pattern based on a copy of the gesture. When the system returns from the custom fill pattern routine, the process continues on to block 626, where the newly created reference fill pattern is applied to the selected object.

In an alternate embodiment of the present invention, the user is given a choice as to whether a custom line style or fill pattern should be created by the system. In the case where the gesture drawn by the user is not recognized, the system notifies the user and the user has the option to redraw the gesture or to leave the gesture as drawn.

In the preferred embodiment, a gesture can be recognized into a fill pattern or line style using many different techniques. One such technique for recognizing a gesture into a fill pattern assumes that all inking done between each pen down and pen up are either taps or strokes. If the gesture does not contain any strokes, the system selects a fill pattern consisting of a gray pattern with a density based on the density of the taps. If the gesture is made up of mixed taps and strokes, then the system assumes a fill pattern is not being defined and leaves the gesture as it is drawn. The user may then invoke the custom fill pattern routine. Each stroke is then perfected, i.e., turned into a straight line. The perfected strokes are aligned to the four primary and four secondary compass points. If a stroke does not closely enough correspond to such a line, then the system assumes the gesture is not a fill pattern. If the strokes have more than two orientations, or if the orientations are not at right angles to each other, the system assumes the gesture is not a fill pattern. Otherwise, the system assumes the fill pattern is a cross-hatch fill, either orthogonal or diagonal.

A technique for recognizing a gesture into a line style is similar to the technique for recognizing a gesture into a fill pattern. The system assumes that all inking done between each pen down and pen up are either taps or strokes. If the gesture does not contain any strokes, the system selects a line style consisting of a dotted line. If the gesture contains mixed taps and strokes, then the system selects an appropriate dot-dash line style. If the gesture contains only one stroke the system selects a solid line style. The system selects a dashed line style if the gesture is made up of more than one stroke.

A method for changing an attribute of a graphic object has been described. It will be apparent that many variations of the principles taught herein are equivalent and fall within this invention, as defined by the following claims. The invention is not limited to the embodiments and combinations described herein and one part of the invention could be combined with another system.

I claim:

1. A method of altering an attribute of a graphic object in a computer system, the attribute having a format and the computer system including a handwriting instrument and an electronic tablet, the method comprising the steps of:

defining input areas on the electronic tablet, each associated with one attribute of the graphic object;

drawing a gesture with the handwriting instrument over a selected one of the input areas, the gesture drawn being indicative of a desired format selected for the attribute associated with the selected input area;

recognizing the gesture drawn over the selected input area;

determining the desired format represented by the gesture drawn; and changing the format of the attribute of the graphic object associated with the selected input area to the desired format.

2. The method of claim 1 wherein one of the attributes is a line style and the associated input area is a style border, and wherein the step of changing the format of the attribute includes changing the line style to the desired format and displaying the graphic object on the electronic tablet with the desired format.

3. The method of claim 1 wherein one of the attributes is a fill pattern and the associated input area is a selection area, and wherein the step of changing the format of the attribute includes changing the fill pattern to the desired format and displaying the graphic object on the electronic tablet with the desired format.

4. The method of claim 1 wherein the step of recognizing the gesture includes the additional steps of:

comparing the gesture drawn to a plurality of reference gestures; and selecting a reference gesture which is determined as matching the gesture drawn.

5. The method of claim 1 wherein the step of determining the desired format represented by the handwritten gesture includes the additional step of undertaking a custom recognition process when the gesture representing the desired format is not recognizable.

6. The method of claim 5 wherein the custom recognition process includes the steps of:

storing data points representing the gesture drawn, the data points corresponding to x-y coordinate points in a path traveled by the handwriting instrument as the gesture is drawn; and creating a reference gesture from the stored data points.

7. The method of claim 6 including, prior to the step of storing data points representing the gesture drawn, the step of modifying the data points representing the gesture drawn.

8. The method of claim 7 wherein the data points representing the gesture are manually modified by the user redrawing the gesture.

9. The method of claim 7 wherein the data points representing the gesture drawn are automatically modified by the computer system smoothing the data points.

10. A method of altering a fill pattern of a graphic object in a computer system, the graphic object having a border and a size, the fill pattern being inside of the border, and the computer system including a handwriting instrument and an electronic tablet, the method comprising the steps of:

drawing a gesture within the border of the graphic object with the handwriting instrument;

recognizing the gesture drawn;

creating a fill pattern comprising replications of the recognized gesture drawn, ; and filling the inside of the border of the graphic object with the created fill pattern.

11. The method of claim 10 wherein the fill pattern has a density which is dependent on size of the gesture and size of the graphic object.

12. The method of claim 10 wherein the gesture drawn by the user is made up of a plurality of dots and density of the fill pattern is dependent on density of the dots.

13. The method of claim 10 wherein the gesture drawn by the user is made up of a plurality of roughly parallel strokes and density of the fill pattern is dependent on density of the strokes.

14. A method of altering a line style of a graphic object in a computer system, the graphic object having a border, and the computer system including a handwriting instrument and an electronic tablet, the method comprising the steps of:

drawing a gesture within a predefined area associated with the graphic object with the handwriting instrument;

recognizing the gesture drawn;

creating a line style comprising replications of the recognized gesture drawn; and applying the created line style to the border of the graphic object.

15. A computer system for changing an attribute of an object from a first format to a second format, comprising:

an electronic tablet for inputting handwritten data into the computer system;

means for displaying on the electronic tablet the object with the attribute set to the first format;

means for receiving handwritten data, the handwritten data being drawn at a location on the electronic tablet that corresponds to the displayed object and the attribute of the displayed object;

a recognizer for recognizing the received handwritten data as a gesture, the gesture identifying the second format; and means for redisplaying on the electronic tablet the object with the attribute set to the second format.

16. The computer system of claim 15 wherein the location is in proximity to the attribute of the displayed object.

17. The computer system of claim 16 wherein the attribute is a line style.

18. The computer system of claim 16 wherein the attribute is a fill pattern.

19. A method in a computer system for changing an attribute of a displayed object, the attribute having a plurality of formats, the computer system having a handwriting instrument and an electronic tablet, the method comprising the step of:

displaying the object with the attribute in one of the plurality of formats on the electronic tablet;

receiving handwritten data that is input using the handwriting instrument and electronic tablet; and when the handwritten data is drawn within a region of the electronic tablet that corresponds to the displayed object and the attribute of the displayed object,
determining that the handwritten data corresponds to another one of the plurality of formats; and
redisplaying the object with the attribute in the determined other one of the plurality of formats.

20. A method in a computer system for changing an attribute of one of a plurality of displayed objects, each object having a plurality of attributes, each attribute having a plurality of formats, the method comprising the steps of:

displaying each of the plurality of objects on an electronic tablet;

receiving data drawn by a user of the computer system at a location on the electronic tablet;

selecting a displayed object based on the location of the drawn data;

selecting an attribute of the selected object based on the location of the drawn data;

determining whether the drawn data corresponds to one of the plurality of formats of the selected attribute; and when the drawn data corresponds to one of the plurality of formats of the selected attribute, redisplaying the selected object with the selected attribute changed to the format corresponding to the drawn data.

21. The method of claim 20 including the step of:

when the drawn data does not correspond to one of the plurality of formats of the selected attribute,
creating a format that is based on the drawn data; and
redisplaying the selected object with the selected attribute changed to the created format.

22. A method of altering an attribute of a graphic object in a computer system, the attribute having a format, and the computer including a handwriting instrument and an electronic tablet, the method comprising the steps of:

displaying an object on the electronic tablet;

receiving data drawn by a user of the computer system at a location on the electronic tablet;

selecting an attribute of the object based on the location of the drawn data;

creating a format for the attribute of that object comprising replications of the drawn data; and changing the selected attribute of the object to consist of replications of the drawn data.

* * * * *